US008281304B2

(12) United States Patent
Kimura

(10) Patent No.: US 8,281,304 B2
(45) Date of Patent: Oct. 2, 2012

(54) HIGH AVAILABILITY SYSTEM AND EXECUTION STATE CONTROL METHOD

(75) Inventor: Tetsuro Kimura, Tama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1049 days.

(21) Appl. No.: 12/233,461

(22) Filed: Sep. 18, 2008

(65) Prior Publication Data

US 2009/0083735 A1    Mar. 26, 2009

(30) Foreign Application Priority Data

Sep. 26, 2007  (JP) ................................. 2007-250089

(51) Int. Cl.
*G06F 9/455*  (2006.01)
*G06F 9/46*   (2006.01)
(52) U.S. Cl. .......................................... 718/1; 718/100
(58) Field of Classification Search ........................ None
See application file for complete search history.

(56) References Cited

U.S. PATENT DOCUMENTS

| 5,615,403 | A | 3/1997 | Bissett et al. | ................. 395/881 |
| 6,321,377 | B1* | 11/2001 | Beadle et al. | ................. 717/148 |
| 7,039,012 | B2* | 5/2006 | Nakano et al. | ................. 370/230 |
| 2006/0133426 | A1* | 6/2006 | Craddock et al. | ............. 370/503 |
| 2009/0064136 | A1* | 3/2009 | Dow et al. | ......................... 718/1 |

FOREIGN PATENT DOCUMENTS

JP    2007-219757 A    8/2007

OTHER PUBLICATIONS

Search report dated Sep. 29, 2009 from corresponding Japanese Patent Appln No. 2007-250089.
Daniel Stodden, "*Semi-active Workload Replication and Live Migration with Paravirtual Machines*", Xen Summit, Apr. 17, 2007, 12 pages.
Daniel Stodden, "Semi-active Workload Replication with Distributed Vitual Machines"; *IFIP Working Group 10.3 on Concurrent Systems*, Feb. 14, 2007, 27 pages.

* cited by examiner

*Primary Examiner* — Kenneth Tang
(74) *Attorney, Agent, or Firm* — Ohlandt, Greeley, Ruggiero & Perle, L.L.P.

(57) ABSTRACT

A high availability system includes a first computer on which a first virtual computer and a first hypervisor managing the first virtual computer operate, and a second computer on which a second virtual computer and a second hypervisor managing the second virtual computer operate. The first hypervisor includes an acquisition unit which acquires synchronization information associated with an event, wherein the event has occurred in the first virtual computer and accompanies an input to the first virtual computer, and a transmission unit which transmits the acquired synchronization information to the second hypervisor. The second hypervisor includes a reception unit which receives the synchronization information from the first hypervisor, and a control unit which performs control to match an input to the second virtual computer with an input to the first virtual computer in accordance with the received synchronization information.

20 Claims, 9 Drawing Sheets

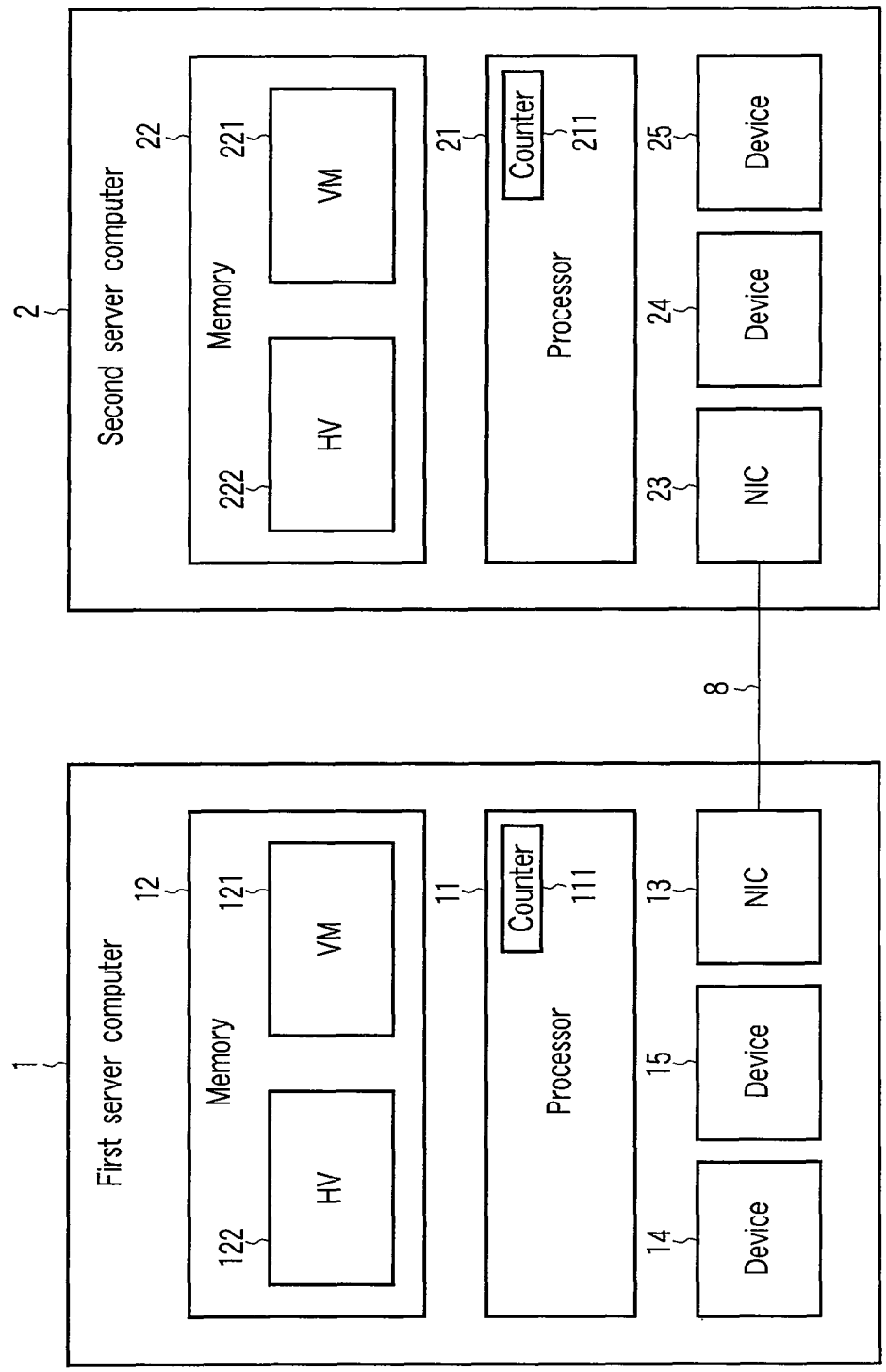
F I G. 1

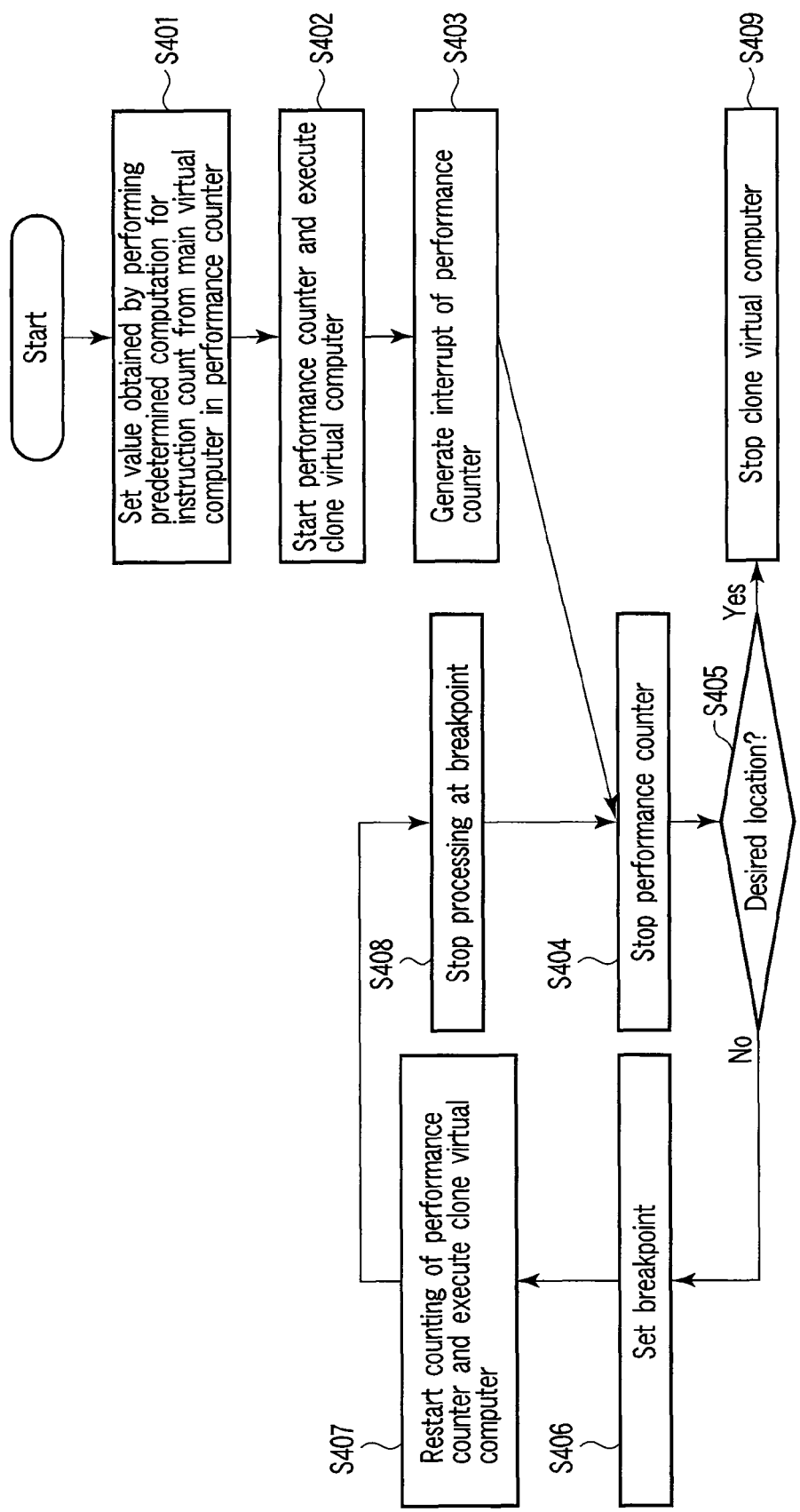
F I G. 9

HIGH AVAILABILITY SYSTEM AND EXECUTION STATE CONTROL METHOD

CROSS-REFERENCE TO RELATED APPLICATIONS

This application is based upon and claims the benefit of priority from prior Japanese Patent Application No. 2007-250089, filed Sep. 26, 2007, the entire contents of which are incorporated herein by reference.

BACKGROUND OF THE INVENTION

1. Field of the Invention

The present invention relates to a high availability system to which a duplexing technique is applied and an execution state control method for the system.

2. Description of the Related Art

There are available techniques of allowing a server computer to continue a service by concealing a fault caused in the hardware of the server computer. As such a technique, a fault tolerant server is known. In a fault tolerant server, all the main pieces of hardware are duplexed. The fault tolerant server is equipped with dedicated hardware for controlling the duplexed hardware. The dedicated hardware achieves perfect synchronous execution by the duplexed hardware. For this reason, even if a fault occurs in a given portion of the duplexed hardware, the faulty portion is automatically disconnected to allow the server to continue a service.

Such a fault tolerant server, however, requires dual redundant main components. In addition, since the server needs to be equipped with dedicated hardware, the server becomes very expensive. Furthermore, since a special design is required to mount dedicated hardware, it is difficult to follow rapid advances in server hardware technology.

As a technique replacing the technique using dedicated hardware for duplexing, a technique of forming a fault tolerant server by combining two general servers (unitary severs which are not duplexed) is available.

The technique disclosed in U.S. Pat. No. 5,615,403 implements a fault tolerant system by combining two independent servers. According to this technique, based on a prerequisite that the CPUs of two servers each comprise logically two or more CPUs using SMPs, multicores, and the like, the servers are duplexed by synchronizing execution by the two servers using software.

The behaviors of OSs and applications become nondeterministic due to I/O events which occur asynchronously with the execution of the OSs and applications. For this reason, in order to implement a duplexed system by using two independent servers, it is absolutely necessary to synchronize nondeterministic I/O events between the servers. The technique disclosed in U.S. Pat. No. 5,615,403 solves the above problem by dividing the two CPUs in each server into a CE (Computing Elements) in charge of the execution of an OS and applications and an IOP (I/O processor) in charge of input/output operation and separating the execution of the OSs and applications from I/O operation.

The method of forming a duplexed fault tolerant server by combining two independent servers can use inexpensive servers equipped with latest techniques which are mass-produced. However, since two servers must be permanently assigned for a fault tolerant server, it is impossible to change the combination of servers constituting a duplexed system during operation. When, for example, one of two serves constituting a fault tolerant server is to be stopped for maintenance, it is preferable to continue duplexed operation by making the third server take over the processing by the server which is stopped, in order to prevent a non-duplexed operation state from occurring. However, it is impossible to perform such operation.

In addition, I/O processing and OS/application processing are assigned to different CPUs. For this reason, when the load of I/O processing or the load of OS/application processing is disproportionally heavy, it is impossible to make full use of the ability of the hardware of each server.

BRIEF SUMMARY OF THE INVENTION

According to an aspect of the present invention, there is provided a high availability system which includes a first server computer on which a first virtual computer and a first hypervisor for managing the first virtual computer operate, and a second server computer on which a second virtual computer and a second hypervisor for managing the second virtual computer operate, wherein the first hypervisor includes an acquisition unit configured to acquire synchronization information associated with an event, wherein the event has occurred in the first virtual computer and the event accompanies an input to the first virtual computer, and a transmission unit configured to transmit the acquired synchronization information to the second hypervisor, and the second hypervisor includes a reception unit configured to receive the synchronization information from the first hypervisor, and a control unit configured to perform control to match an input to the second virtual computer with an input to the first virtual computer in accordance with the received synchronization information.

BRIEF DESCRIPTION OF THE SEVERAL VIEWS OF THE DRAWING

FIG. 1 is a block diagram showing an example of the schematic arrangement of a high availability system according to an embodiment;

FIG. 9 is a flowchart showing another example of the processing procedure for causing a clone virtual computer to match the interrupt timing.

DETAILED DESCRIPTION OF THE INVENTION

Figure 2:
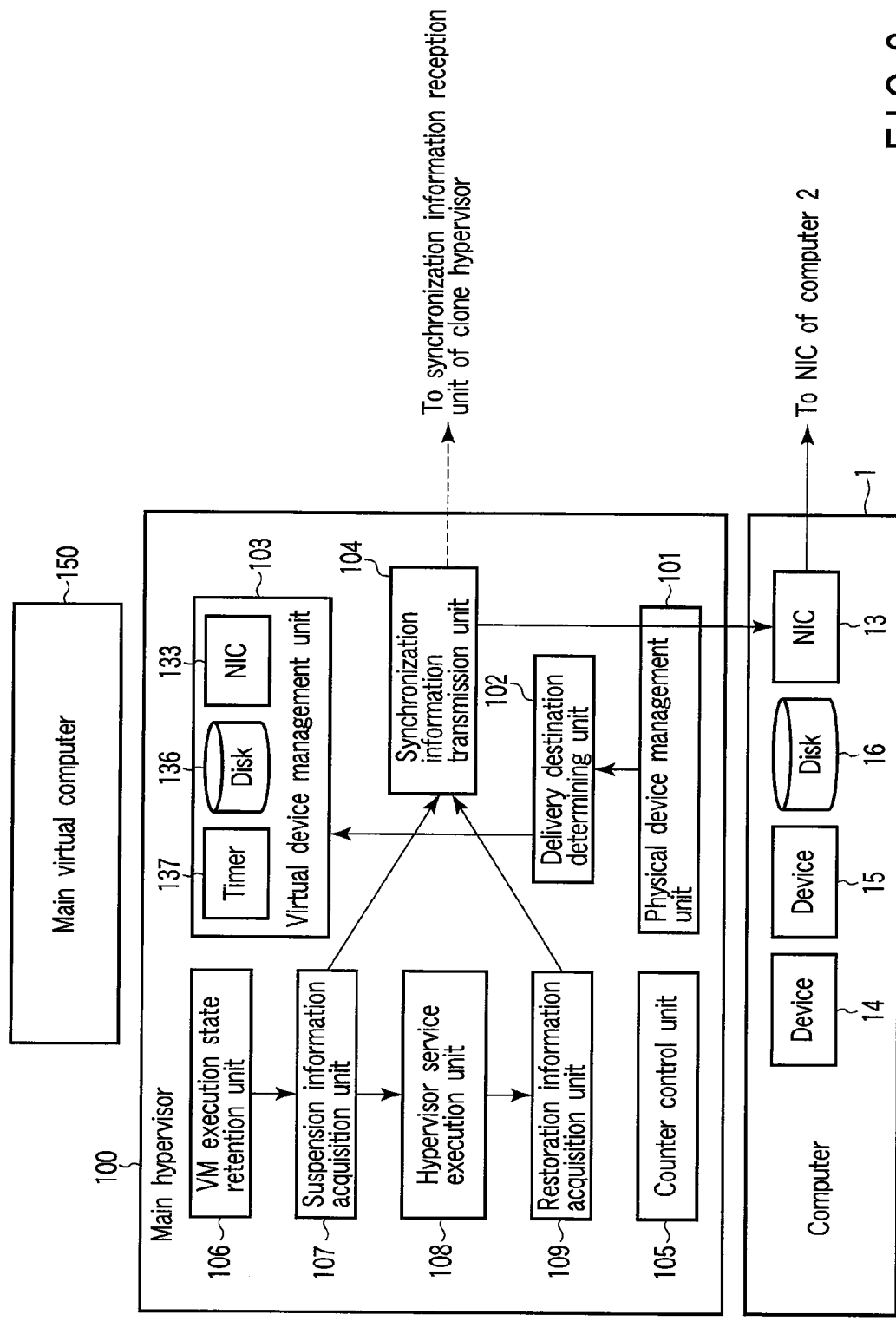
FIG. 2 is a block diagram showing an example of the arrangement of functional blocks of a hypervisor in a main server computer.

An embodiment of the present invention will be described below with reference to the views of the accompanying drawing.

As shown in FIG. 1, the high availability system of this embodiment includes two server computers 1 and 2.

The first server computer 1 comprises a processor 11, a memory 12, a communication device (NIC (Network Interface Card)) 13, and physical devices 14 and 15. A counter 111 which can be used as a performance counter exists in the processor 11.

Likewise, the second server computer 2 comprises a processor 21, a memory 22, a communication device 23, and a plurality of devices 24 and 25. A counter 211 which can be used as a performance counter exists in the processor 21.

The server computers 1 and 2 can communicate with each other via a predetermined network 8.

Note that the devices shown in FIG. 1 are merely examples, and the types and number of devices are arbitrary.

In the server computer 1 or 2, the memory 12 or 22 has a memory area 121 or 221 in which OS software and application program software which operate in a virtual computer (to be also called a virtual machine (VM)) and data are stored, and a memory area 122 or 222 in which programs for a hypervisor (HV) and data are stored. The hypervisor (HV) performs processing such as converting input information to the server computer into an input to the virtual computer (VM).

The processor 11 or 21 reads out and executes a program stored in the memory area 122 or 222 associated with the hypervisor, and also reads out and executes a program in the memory area 121 or 221 associated with the virtual computer.

The processor 11 or 21 has a plurality of privilege levels. A program for the hypervisor operates at the highest privilege level among the plurality of privilege levels. A program for the virtual computer operates at a privilege level lower than that at which the hypervisor operates. The programs for the virtual computer include an OS and application programs. The OS for the virtual computer operates at a privilege level higher than that at which application programs operate.

When a program for the virtual computer is to perform a process requiring the highest privilege level during its execution, the program calls the hypervisor from the virtual computer and requests the called hypervisor to perform the process. Note that the manner of calling the hypervisor differs depending on whether a virtual support mechanism is mounted in the processor or not. If a privileged instruction violation can be caused by a process performed by the OS for the virtual computer, the hypervisor is called by using the privileged instruction violation as a trigger. If no virtual support mechanism is mounted, a code for calling the hypervisor is inserted into the codes of the OS. Alternatively, codes are scanned at a proper timing in the interval between the instant a program is loaded into the memory and the instant the program is executed, and a code for calling the hypervisor is inserted. This embodiment can be executed regardless of whether a virtual support mechanism is mounted or not.

In the following description, in the high availability system shown in FIG. 1, the virtual computer operating on the server computer 1 is regarded as a main virtual computer, and the virtual computer operating on the server computer 2 is regarded as a clone virtual computer.

FIG. 2 shows an example of the functional blocks of the hypervisor in the main server computer 1.

Referring to FIG. 2, reference numeral 1 denotes the main server computer; 13, a NIC; 14 and 15, physical devices; 16, a disk; 100, a main hypervisor; and 150, a main virtual computer.

In the main hypervisor 100, reference numeral 101 denotes a physical device management unit; 102, a delivery destination determining unit; 103, a virtual device management unit; 104, a synchronization information transmission unit; 105, a counter control unit; 106, a virtual computer execution state retention unit (VM execution state retention unit); 107, a suspension information acquisition unit; 108, a hypervisor service execution unit; and 109, a restoration information acquisition unit.

In the virtual device management unit 103, reference numerals 133, 136, and 137 respectively denote a NIC, a Disk, and a timer as virtual devices.

The following is an outline of each unit in the main hypervisor 100.

The physical device management unit 101 manages physical devices.

The delivery destination determining unit 102 determines the delivery destination of the state of a physical device.

The virtual device management unit 103 manages virtual devices.

The synchronization information transmission unit 104 transmits synchronization information.

The counter control unit 105 controls the performance counter. As the performance counter, the counter 111 in the processor 11 can be used.

The VM execution state retention unit 106 retains the execution state of the virtual computer (VM).

The suspension information acquisition unit 107 performs necessary processing during the suspension of processing by the main virtual computer 150.

The hypervisor service execution unit 108 executes a primary hypervisor service.

The restoration information acquisition unit 109 performs necessary processing when processing by the main virtual computer 150 is restored.

Figure 3:
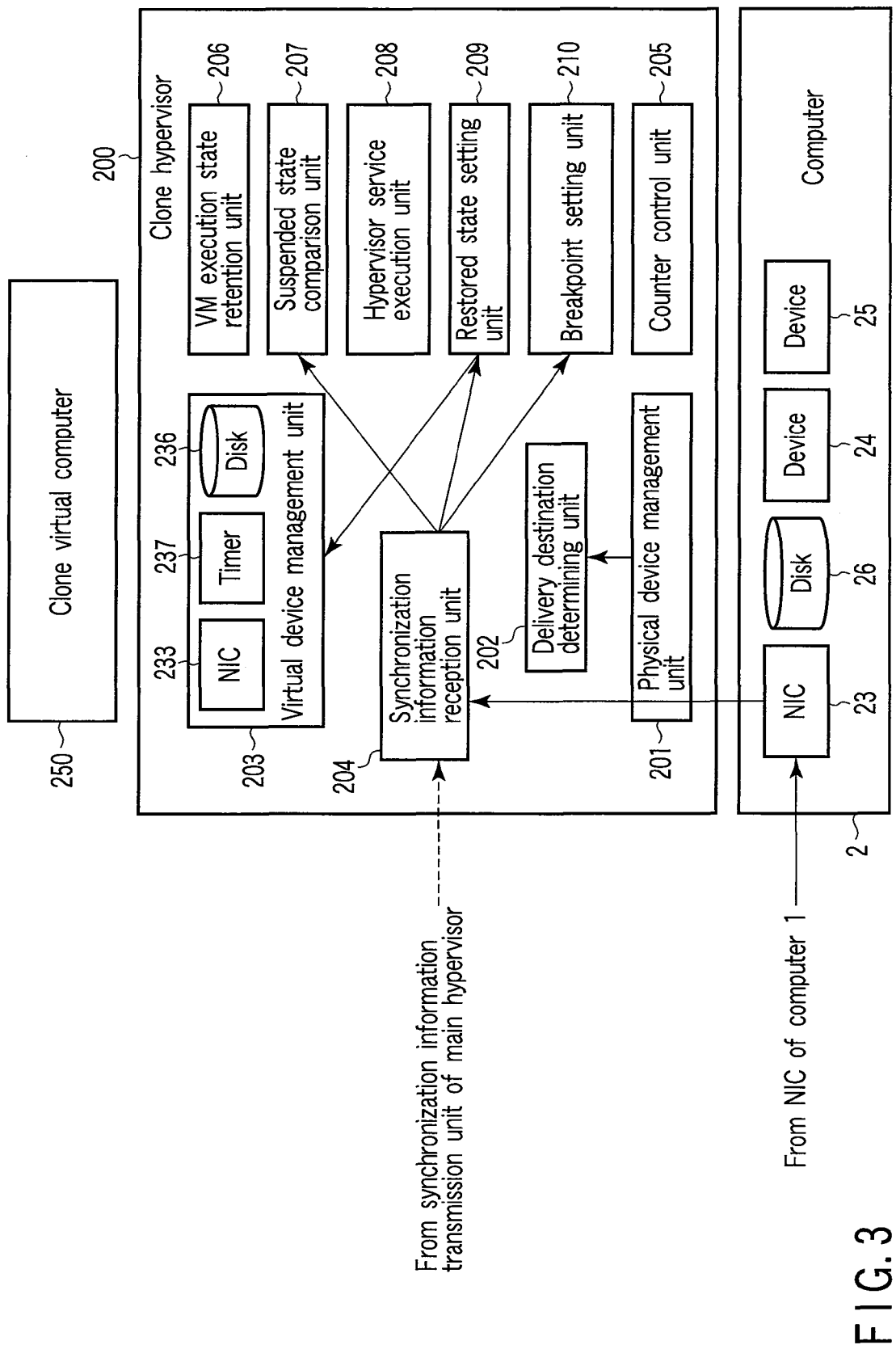
FIG. 3 is a block diagram showing an example of the arrangement of functional blocks of a hypervisor in a clone server computer.

FIG. 3 shows an example of the arrangement of the functional blocks of the hypervisor in the clone server computer 2.

Referring to FIG. 3, reference numeral 2 denotes the clone computer; 23, the NIC; 24 and 25, the physical devices; 26, a disk; 200, a clone hypervisor; and 250, a clone virtual computer.

In the clone hypervisor 200, reference numeral 201 denotes a physical device management unit; 202, a delivery destination determining unit; 203, a virtual device management unit; 204, a synchronization information reception unit; 205, a counter control unit; 206, a virtual computer execution state retention unit (VM execution state retention unit); 207, a suspended state comparison unit; 208, a hypervisor service execution unit; 209, a restored state setting unit; and 210, a breakpoint setting unit.

In the virtual device management unit 203, reference numerals 233, 236, and 237 respectively denote a NIC, a disk, and a timer as virtual devices.

Note that the physical and virtual devices shown in FIG. 3 are merely examples, and the types and numbers of physical and virtual devices are arbitrary.

The following is an outline of each unit in the clone hypervisor 200.

The physical device management unit 201 manages physical devices.

The delivery destination determining unit 202 determines the delivery destination of the state of a physical device.

The virtual device management unit 203 manages virtual devices.

The synchronization information reception unit 204 receives synchronization information.

The counter control unit 205 controls the performance counter. As the performance counter, the counter 211 in the processor 21 can be used.

The VM execution state retention unit 206 retains the execution state of the virtual computer (VM).

The suspended state comparing unit 207 performs necessary processing during the suspension of processing by the clone virtual computer 250.

The hypervisor service execution unit 208 executes a primary hypervisor service.

The restored state setting unit 209 performs necessary processing at the time of restoration to processing by the clone virtual computer 250.

The breakpoint setting unit 210 sets a breakpoint.

Note that the server computers 1 and 2 each can have both the arrangement for the main side (FIG. 3) and the arrangement for the clone side (FIG. 4), and the server computers 1 and 2 can interchange the roles of the main and clone systems.

The arrangement and operation of each hypervisor will be mainly described below.

In the main server computer 1, the main hypervisor 100 manages the physical devices 14 and 15 and the like connected to the server computer 1. The main hypervisor 100 provides the virtual devices 133, 136, and 137 and the like for the main virtual computer 150. The main virtual computer 150 recognizes the virtual devices as devices.

In the clone server computer 2, the clone hypervisor 200 manages the physical devices 24 and 25 and the like connected to the server computer 2. The clone hypervisor 200 provides the virtual devices 233, 236, and 237 and the like for the clone virtual computer 250. The clone virtual computer 250 recognizes the virtual devices as devices.

The physical and virtual devices shown in FIGS. 2 and 3 are merely examples, and the types and numbers of physical and virtual devices are arbitrary.

Note that as an embodiment of each hypervisor, the hypervisor may be configured such that a special virtual computer called a management domain has part of the function of the hypervisor.

The main hypervisor 100 discriminates information associated with the state of a physical device connected to the server computer 1 into information which can be read by the main virtual computer 150 and information which cannot be read by the main virtual computer 150. The delivery destination determining unit 102 performs this discrimination. The delivery destination determining unit 102 reflects (copies) only information which can be read by the main virtual computer 150 in the state of the virtual device. For example, when the console of the server computer 1 is assigned to the main virtual computer 150, information input with the keyboard is reflected in the state of the virtual device. If the console is not assigned to the main virtual computer 150, information input with the keyboard is not reflected in the state of the virtual device.

In this embodiment, a copy of an input to the main virtual computer 150 operating on the main server computer 1 is informed to the clone server computer 2, and the same input as that to the main virtual computer 150 is supplied to the clone virtual computer 250, thereby performing control to make the main virtual computer 150 and the clone virtual computer 250 exhibit the same behavior.

In order to implement this operation, input information (synchronization information) determined as an input to a virtual device in the main virtual computer 150 by the delivery destination determining unit 102 in the main hypervisor 100 is reflected in the state of a corresponding virtual device in the main virtual computer 150, and is sent to the clone hypervisor 200 on the clone server computer 2 by the synchronization information transmission unit 104.

The synchronization information reception unit 204 of the clone hypervisor 200 receives this input information (synchronization information). The received input information is reflected in the state of the virtual device in the clone virtual computer 250.

This causes the clone virtual computer 250 to receive the same input data as that to the main virtual computer 150.

In the main hypervisor 100 and the clone hypervisor 200, the synchronization information transmission unit 104 and the synchronization information reception unit 204 copy input data between the virtual computers and exchange synchronization information containing information necessary for synchronization between the virtual computers. Note that the transfer route of actual data passes through the communication device 13 of the computer 1, a network connecting the two computers 1 and 2, and the communication device 23 of the computer 2.

In order to implement this input data copying operation, the synchronization information transmission unit 104 of the main hypervisor 100 and the synchronization information reception unit 204 of the clone hypervisor 200 respectively manage pieces of information for specifying communication partners. Information for specifying a communication partner is, for example, the network address (e.g., the IP address or port number) of the remote computer. If, for example, a hypervisor manages a plurality of virtual computers, the hypervisor also requires the identification information (ID) of a virtual computer, as part of the information for specifying the communication partner, which identifies a virtual computer of the plurality of virtual computers. Note that information for specifying a communication partner can be manually set before the activation of a virtual computer or can be automatically set by another module.

In general, a virtual computer has a plurality of virtual devices. Of the information associated with the state of a physical device of the computer 1, information which is determined to be reflected in the state of a corresponding virtual device of the delivery destination determining unit 102 of the main hypervisor 100 is sent to the clone hypervisor 200 via the synchronization information transmission unit 104. This information contains the identification information (ID) of the virtual device which specifies the virtual device to be reflected and information associated with the state of the virtual device.

In general, when the processing currently executed by a virtual computer is suspended due to hypervisor call, interrupt, or the like, the hypervisor executes a service corresponding to the cause of the suspension, and selects a virtual computer to be executed next. The hypervisor then transfers the processing to the selected virtual computer. In this embodiment, the hypervisor service execution units 108 and 208 are in charge of this operation.

In the main server computer 1, when control is transferred from the main virtual computer 150 to the main hypervisor 100, the VM execution state retention unit 106 retains the execution state of the main virtual computer 150, and the suspension information acquisition unit 107 inspects the cause of the suspension of processing by the virtual computer. The suspension information acquisition unit 107 then acquires synchronization information (the contents of the information will be described later) corresponding to the cause of the suspension. The synchronization information transmission unit 104 transmits the synchronization information corresponding to the cause of the suspension to the clone hypervisor 200. If the main hypervisor 100 selects the main virtual computer 150 as a virtual computer to which control is to be transferred next, the restoration information acquisition unit 109 inspects a state at the time of restoration of the main virtual computer 150, and acquires synchronization information (the contents of the information will be described later) corresponding to the state at the time of restoration. The synchronization information transmission unit 104 transmits the synchronization information corresponding to the state at the time of restoration to the clone hypervisor 200.

In the clone server computer 2, the restored state setting unit 209 prepares the restored state of the clone virtual computer 250 by using the restored state of the main virtual computer 150 which is received by the synchronization information reception unit 204 and the state in which the processing is suspended again and control is transferred to the clone hypervisor 200. If the suspended state of the main virtual computer 150 is an interrupt, the breakpoint setting unit 210 sets a breakpoint, and control is transferred to the clone virtual computer 250.

In order to match the execution state of the clone virtual computer 250 with the execution state of the main virtual computer 150, it is not sufficient to copy the information of each virtual device and match input information. It is necessary to match the timings at which the two virtual computers receive the pieces of information of the virtual devices.

More specifically, the order relation between events such as hypervisor call, the occurrence of an exception, updating of the information associated with the state of the virtual device, and the generation of an interrupt on the main hypervisor 100 side needs to match that on the clone hypervisor 200 side.

In addition, it is necessary to generate an interrupt in the identical states in the execution processes of the two virtual computers. That is, execution states cannot match unless the main virtual computer 150 and the clone virtual computer 250 accept interrupts at the same location (program counter) in instruction sequences executed by the respective virtual computers.

Figure 4:
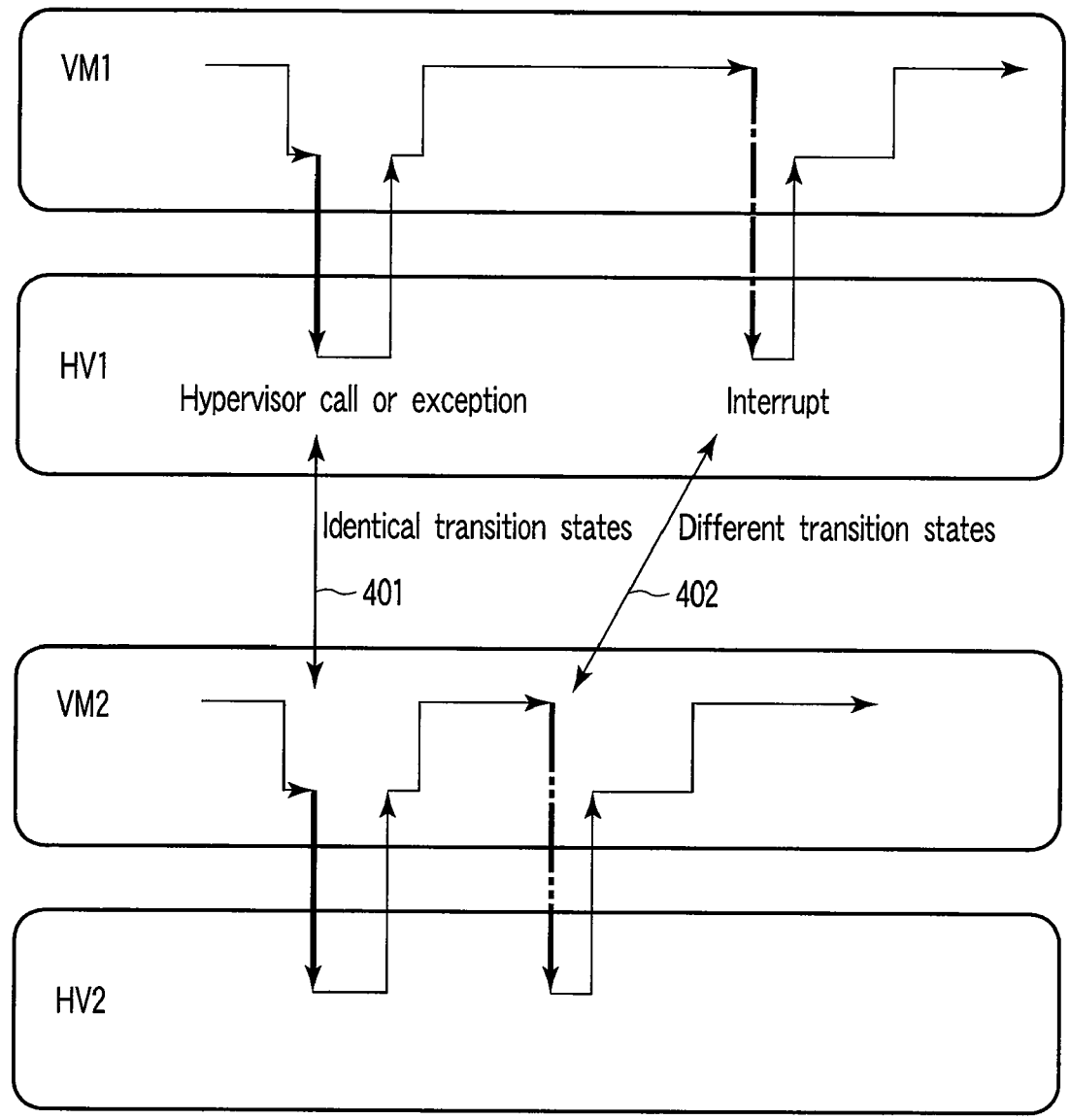
FIG. 4 is a view for explaining control concerning the interrupt timing with respect to processing by a virtual computer.
Figure 5:
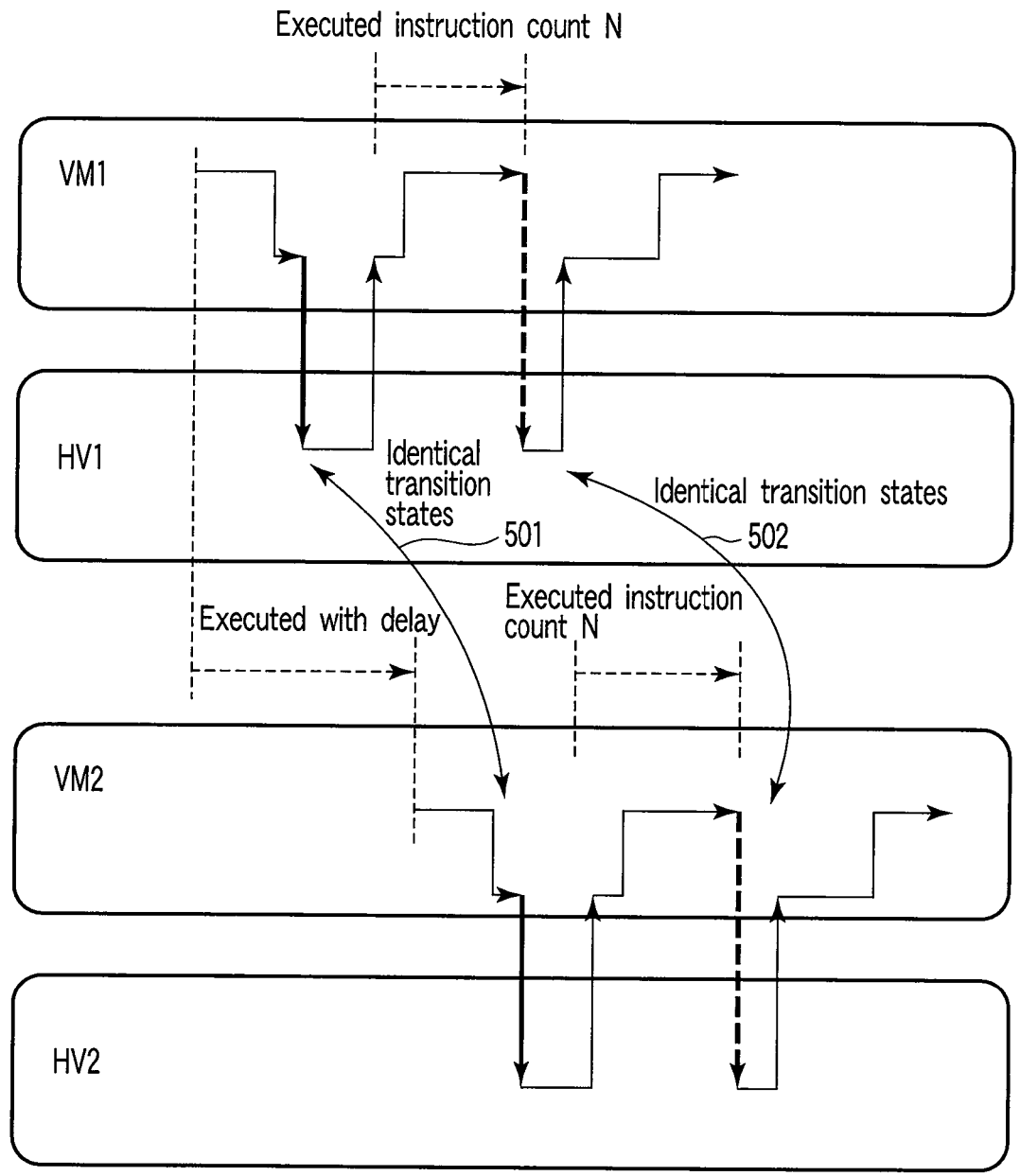
FIG. 5 is a view for explaining control concerning the interrupt timing with respect to processing by a virtual computer.

This point will be described with reference to FIGS. 4 and 5. Referring to FIGS. 4 and 5, reference symbol HV1 denotes a main hypervisor; HV2, a clone hypervisor; VM1, a main virtual computer; and VM2, a clone virtual computer.

Hypervisor call and an exception are deterministic events which occur at specific positions in a program. In contrast, an interrupt is a nondeterministic event which occurs at an arbitrary position in a program. When the two server computers in FIG. 4 simultaneously execute processing, hypervisor call or an exception exhibits the identical transition states between the two server computers 1 and 2 as denoted by reference numeral 401, but an interrupt exhibits different transition states as denoted by reference numeral 402.

In this embodiment, therefore, as shown in FIG. 5, first of all, the main server computer 1 executes the main virtual computer 150. With some delay from this execution, the clone server computer 2 executes the clone virtual computer 250. The main server computer 1 then checks whether the current time is the timing of the generation of an interrupt in the main virtual computer 150 (more specifically the number of instructions executed from the reference time point (e.g., the time point of previous restoration to the virtual computer)), and transmits information indicating the timing of the generation of the interrupt from the main hypervisor 100 to the clone hypervisor 200. In the clone hypervisor 200, the breakpoint setting unit 210 sets a breakpoint so as to generate an interrupt at the same timing in the clone virtual computer 250 in accordance with the information indicating the timing of the generation of the interrupt, thereby generating the identical transition states, as denoted by reference numeral 502. Note that since hypervisor call or an exception is a deterministic event as described above, it exhibits the identical transition states without setting the above breakpoint, as denoted by reference numeral 501.

In this embodiment, in the main virtual computer 150 and the clone virtual computer 250, the counter control unit 105 and the counter control unit 205 respectively control the counters to match interrupt timings. The breakpoint setting unit 210 sets a breakpoint in accordance with the value of this counter.

The synchronization information transmission unit 104 of the main hypervisor 100 and the synchronization information reception unit 204 of the clone hypervisor 200 transfer not only information associated with the states of the virtual devices but also information of each of the following events in the main server computer 1 every time it occurs:

(A) Hypervisor call issued by the main virtual computer 150;

(B) A response from the main hypervisor 100 corresponding to the above hypervisor call;

(C) Catching of an exception;

(D) Exception handler call in the main virtual computer 150 corresponding to the above exception;

(E) Catching of an interrupt; and (F) Interrupt handler call in the main virtual computer 150 corresponding to the above interrupt.

Processing for each event in the main hypervisor 100 in the main server computer 1 will be described first.

(A) Hypervisor call is an event deterministically generated by the main virtual computer 150 and is an output from the virtual computer to an external unit. It suffices to transfer the occurrence of the event to the clone hypervisor 200. Therefore, the synchronization information to be transmitted may contain "the type of hypervisor call" and "argument information" ("the saved contents of the register" or the like may be sent). If the hypervisor manages a plurality of virtual computers, only hypervisor call caused by the main virtual computer 150 is a processing target, but hypervisor call caused by other virtual computers does not become a processing target.

(B) When the main hypervisor 100 returns a response to hypervisor call, the contents of the response are input to the main virtual computer 150. Therefore, it suffices to transfer the contents of the response to the clone hypervisor 200. Note that as the information of the response, various kinds of information are conceivable (e.g., the register of the CPU, a stack, the memory space shared by the hypervisor and the virtual computer, and an event channel) depending on how the interface between the hypervisor and the virtual computer is designed. Therefore, the synchronization information to be transmitted may contain "the information of a response to hypervisor call" and "the information of a response route".

(C) Catching of an exception is an event deterministically caused by the main virtual computer 150 and is an output from the virtual computer to an external unit. Therefore, it suffices to transfer the occurrence of the event to the clone hypervisor 200. The synchronization information to be transmitted may therefore contain "the contents of the exception". Note that if the hypervisor manages a plurality of virtual computers, only an exception generated by the main virtual computer 150 is a processing target, but exceptions generated by other virtual computers do not become processing targets.

(D) Assume that the exception handler of the main virtual computer 150 corresponding to an exception is to be called. In this case, if the hypervisor need not perform any special processing for the exception, it suffices to inform exception handler call to the clone hypervisor 200. The synchronization information to be transmitted may therefore contain "information indicating the execution of exception handler call". In contrast, if the hypervisor needs to perform special processing for the exception, it suffices to inform the contents of the processing to the clone hypervisor 200.

(E) With regard to an interrupt generated in a computer, corresponding processing is performed by one of the following cases: the main hypervisor 100 by itself, the main virtual computer 150, and another virtual computer (other than the main virtual computer 150) managed by the main hypervisor 100. With regard to an interrupt other than "the interrupt to be processed by the main virtual computer 150", since the corresponding event is completely concealed from the main virtual computer 150, there is no need to transfer the corresponding information to the clone hypervisor 200. The main hypervisor 100 can transfer only the information of an event which needs to call the interrupt handler of the main virtual computer 150 to the clone hypervisor 200. The interrupt handler of the main virtual computer 150 is activated in accordance with an interrupt issued by the hardware of the I/O device. In addition, for example, this interrupt handler is activated when the hypervisor or another virtual computer generates a software interrupt, independently of a hardware interrupt, to transfer the event to the main virtual computer 150. This interrupt corresponds to, for example, an inter-domain interrupt in Xen.

In addition, in order to re-create suspension of processing due to an interrupt and handler call in the same process, the clone virtual computer 250 acquires the value of the program counter and the information of the number of instructions executed which is counted by the performance counter as the information of an interrupt position (i.e., information for specifying the location where an interrupt has been generated in the main virtual computer 150).

According to the above description, the synchronization information to be transmitted may contain "the identification information (ID) of the main virtual computer 150 in which the interrupt handler is activated", "the information (vector number) of the interrupt", and "the information of the interrupt position".

(F) It suffices to send information (a vector number and the like) associated with call of the handler which processes the interrupt caught in (E) described above to the clone hypervisor 200.

Processing for each event in the clone hypervisor 200 in the clone server computer 2 to which the above information is sent will be described next.

The clone hypervisor 200 stores the synchronization information sent from the main hypervisor 100 in a queue and sequentially processes synchronization information starting from the information stored at the head of the queue. Processing for the synchronization information stored in the queue will be described below.

(A) If synchronization information is hypervisor call, the hypervisor call is an event which is deterministically caused by the clone virtual computer 250 just like the main virtual computer 150. Control is therefore transferred to the clone virtual computer 250, and the hypervisor waits for the issuance of the hypervisor call. When the clone virtual computer 250 issues hypervisor call, it suffices to only check whether the hypervisor call is the same as the hypervisor call written in the synchronization information. After this check, the synchronization information is deleted from the queue.

Note that a response to this hypervisor call conforms to the contents of "(B) the response to the hypervisor call" contained in the synchronization information sent from the main hypervisor 100. That is, the clone hypervisor 200 does not handle this response within itself.

(B) If the synchronization information is a response from the main hypervisor 100 to hypervisor call, preparation is made to return the content of the response from the main hypervisor 100 to the clone virtual computer 250 without any change. More specifically, the contents of the response are stored in the response route contained in the synchronization information. Note that control is not immediately transferred to the clone virtual computer 250 in this case, and the synchronization information is deleted from the queue. The process then advances to the step of processing the next synchronization information.

(C) If the synchronization information is catching of an exception, the catching of the exception is an event which is deterministically caused by the clone virtual computer 250 like the main virtual computer 150. Control is transferred to the clone virtual computer 250, and the hypervisor waits for the issuance of the hypervisor call. When control is transferred from the clone virtual computer 250 to the clone hypervisor 200 due to the exception, it suffices to only check whether the exception is the same as that written in the synchronization information. After this check, the synchronization information is deleted from the queue.

Note that it suffices to delay the response to this hypervisor call until "(D) the response to the exception" contained in the synchronization information sent from the main hypervisor 100 is processed.

(D) Assume that the synchronization information is an exception handler call. In this case, if the hypervisor need not perform any special processing for the exception, it suffices to call the exception handler of the clone virtual computer 250. Note that in this case, the handler is not immediately called, and this synchronization information is deleted from the queue. The process then advances to the step of processing the next synchronization information.

(E) If the synchronization information is interrupt handler call, the hypervisor refers to the information of an interrupt position contained in the synchronization information to determine a location where a pseudo-interrupt is generated. The hypervisor then sets, for example, the breakpoint function of the processor and the number of instructions up to a pseudo-interrupt point in the performance counter which generates an instruct after the execution of a predetermined number of instructions. After such operation, the hypervisor transfers control to the clone virtual computer 250, and waits for an exception which occurs at the pseudo-interrupt point.

(F) The hypervisor refers to information such as an interrupt vector indicated by the synchronization information and makes preparation to activate the interrupt handler.

When the main hypervisor 100 and the clone hypervisor 200 perform the above series of processing in cooperation with each other, the input to the main virtual computer 150 perfectly matches the input to the clone virtual computer 250, thereby implementing the synchronization of execution states.

In this embodiment, the synchronization information transmission unit 104 and the synchronization information reception unit 204 are incorporated in the hypervisors. In order to make full use of the function of a virtual machine, e.g., the function of performing communication protocol processing necessary for network communication, this embodiment can be configured to install different virtual machines called management domains (different from the main virtual computer 150 and the clone virtual computer 250) in the computers 1 and 2 and to make the virtual machines have parts of the functions of the synchronization information transmission unit 104 and synchronization information reception unit 204.

The operation procedure of the main hypervisor 100 which is the hypervisor in the main server computer 1 will be described next.

Figure 6:
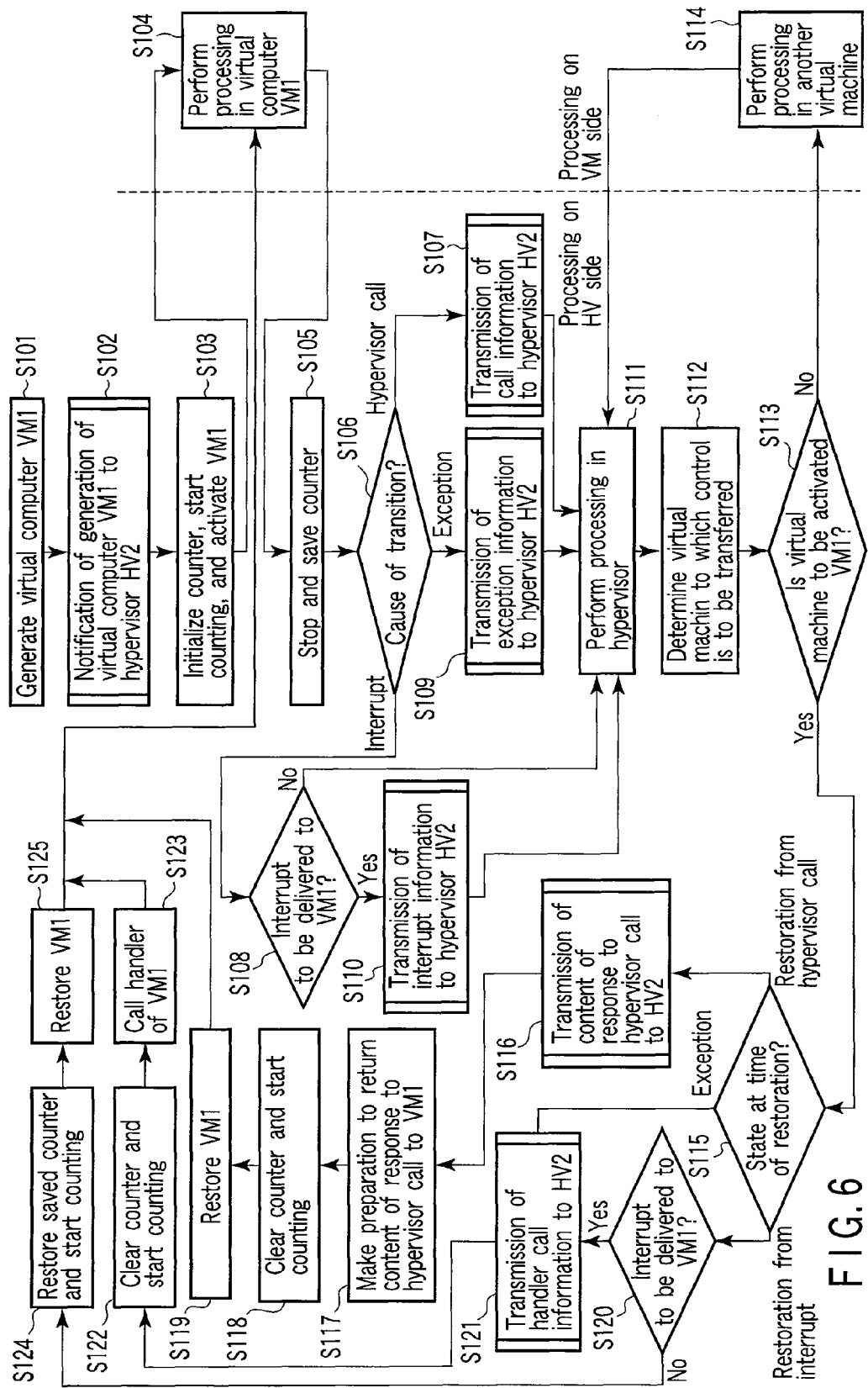
FIG. 6 is a flowchart showing an example of the operation procedure of a hypervisor in the main server computer.

FIG. 6 shows an example of the operation procedure of the main hypervisor 100.

Referring to FIG. 6, reference symbol HV2 denotes a clone hypervisor; VM1, a main virtual computer; and VM2, a clone virtual computer.

In the main hypervisor 100, the hypervisor service execution unit 108 generates the main virtual computer 150 (step S101).

The main hypervisor notifies the clone hypervisor 200 of the generation of the main virtual computer 150 (step S102).

The counter control unit 105 initializes the performance counter (to be referred to as the counter hereinafter), starts counting the number of instructions executed, and activates the main virtual computer 150 (step S103).

In this case, the process temporarily shifts to processing in the main virtual computer 150 (step S104). When hypervisor call, an exception, or an interrupt occurs, the process returns to processing in the main hypervisor 100.

When hypervisor call, an exception, or an interrupt occurs and the process returns to processing in the main hypervisor 100, the counter control unit 105 in the main hypervisor 100 stops the counter and saves the counter (step S105).

The suspension information acquisition unit 107 then inspects the cause of the suspension of processing in the main virtual computer 150.

If the cause of transition is hypervisor call (step S106), the synchronization information transmission unit 104 transmits synchronization information associated with call to the synchronization information reception unit 204 of the clone hypervisor 200 (step S107). The process then shifts to processing in the main hypervisor 100 (step S111).

If the cause of the transition is an exception (step S106), the synchronization information associated with the exception is transmitted in the same manner (step S109), and the process shifts to processing in the main hypervisor 100 (step S111).

If the cause of the transition is an interrupt (step S106) and the interrupt is to be delivered to the main virtual computer 150 (step S108), the hypervisor transmits synchronization information associated with the interrupt (step S110) and the process then shifts to processing in the main hypervisor 100 (step S111) in the same manner as described above. If this interrupt is not delivered to the main virtual computer 150 (step S108), the process skips step S110 and shifts to processing in the main hypervisor 100 (step S111). The hypervisor service execution unit 108 performs the processing in the main hypervisor 100.

After step S111, the hypervisor service execution unit 108 determines a virtual computer to which control is to be transferred (step S112).

If the virtual computer to be activated is not the main virtual computer 150 but another virtual computer (step S113), the hypervisor temporarily performs processing in another virtual computer (step S114). Thereafter, the process returns to processing in the main hypervisor 100 in step S111.

If the virtual computer to be activated is the main virtual computer 150 (step S113), the hypervisor performs processing in step S115 and the subsequent steps.

Assume that the virtual computer to be activated in step S113 is the main virtual computer 150. In this case, when the process returns to processing in the main hypervisor 100, the restoration information acquisition unit 109 in the main hypervisor 100 inspects a state when the main virtual computer 150 is restored.

If the state at the time of restoration is restoration from hypervisor call (step S115), the synchronization information transmission unit 104 transmits a request for a response to hypervisor call to the synchronization information reception unit 204 of the clone hypervisor 200 (step S116). The restoration information acquisition unit 109 makes preparation to return the content of the response to hypervisor call to the main virtual computer 150 (step S117). The counter control unit 105 clears the counter and starts counting (step S118). The hypervisor service execution unit 108 restores the main virtual computer 150 (step S119). Subsequently, the processing is repeated from step S114.

If the state at the time of restoration is an exception (step S115), the hypervisor transmits synchronization information associated with handler call (step S121) in the same manner as described above. The hypervisor then clears the counter and starts counting (step S122). The hypervisor calls the handler of the main virtual computer 150 (step S123). Subsequently, the processing is repeated from step S114.

If the state at the time of restoration is restoration from an interrupt (step S115), and is an interrupt to be delivered to the main virtual computer 150 (step S120), the processing in step S121 and the subsequent steps is performed. If this state is not an interrupt to be delivered to the main virtual computer 150 (step S120), the counter control unit 105 restores the saved counter and starts counting (step S124). The hypervisor service execution unit 108 restores the main virtual computer 150 (step S125). Subsequently, the processing is repeated from step S114.

The operation procedure of the clone hypervisor 200 as a hypervisor in the clone server computer 2 will be described next.

Figure 7:
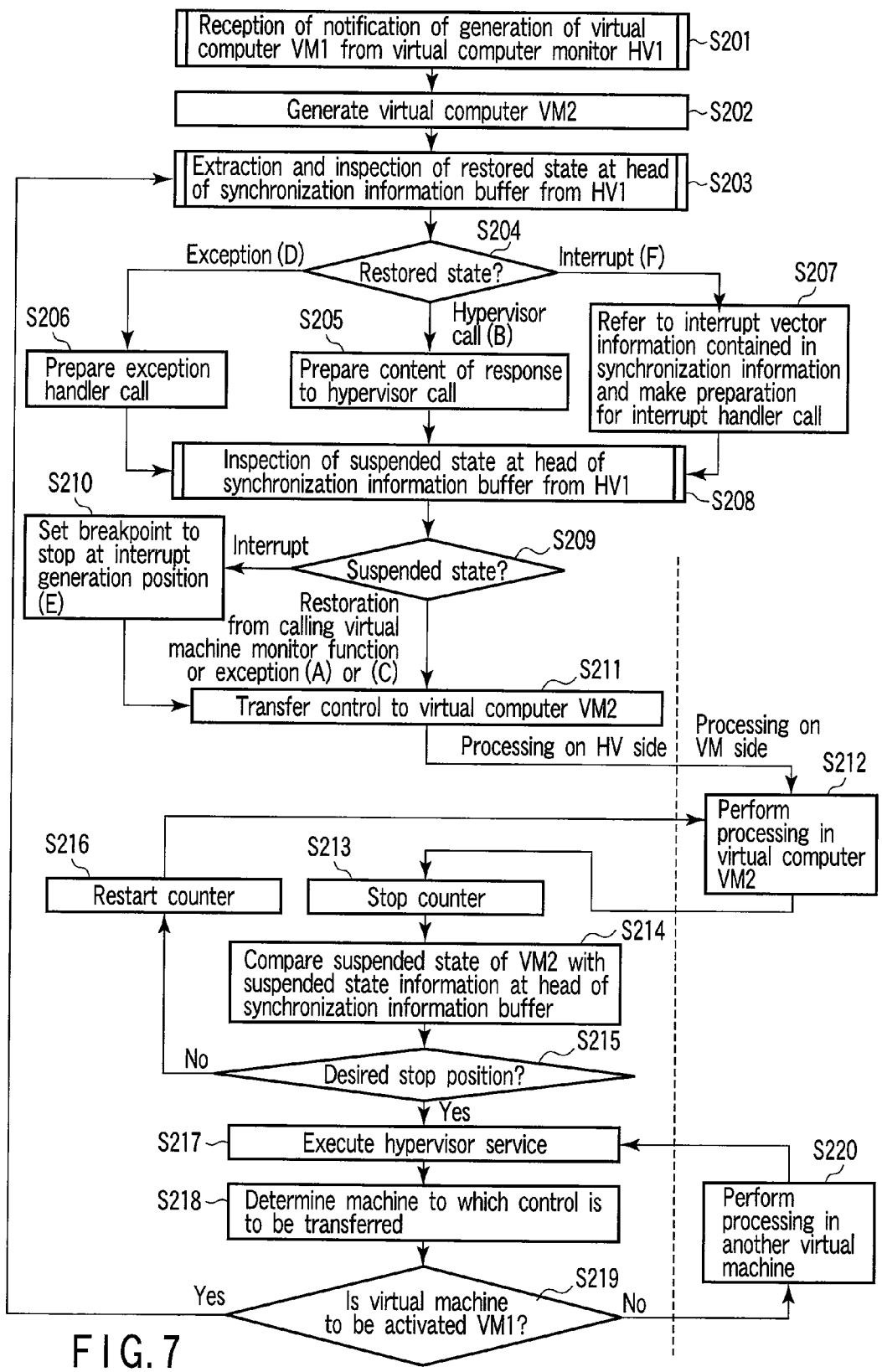
FIG. 7 is a flowchart showing an example of the operation procedure of a hypervisor in the clone server computer.

FIG. 7 shows an example of the operation procedure of the clone hypervisor 200.

Referring to FIG. 7, reference symbol HV1 denotes a main hypervisor; VM1, a main virtual computer; and VM2, a clone virtual computer.

Assume that the synchronization information received from the main hypervisor 100 is stored in a synchronization information buffer (queue).

In the clone hypervisor 200, upon receiving notification of the generation of the main virtual computer 150 from the main hypervisor 100 (step S201), the hypervisor service execution unit 208 generates the clone virtual computer 250 (step S202).

The restored state setting unit 209 extracts and inspects the restored state at the head of the synchronization information buffer (step S203).

If the state at the time of restoration is restoration from hypervisor call (step S204), the restored state setting unit 209 prepares a request for a response to hypervisor call (step S205). The process then advances to step S208.

If the state at the time of restoration is an exception (step S204), the hypervisor makes preparation for exception handler call (step S206). The process then advances to step S208.

If the state at the time of restoration is restoration from an interrupt (step S204), the hypervisor refers to vector information contained in the synchronization information and prepares for interrupt handler call (step S207). The process then advances to step S208.

In step S208, the suspended state comparison unit 207 extracts and inspects the suspended state at the head of the synchronization information buffer (step S208).

If the suspended state is an interrupt (step S209), the breakpoint setting unit 210 sets a breakpoint in the counter to stop at the interrupt generation position (step S210). The hypervisor service execution unit 208 transfers control to the clone virtual computer 250 (step S211).

If the suspended state is restoration from call or an exception (step S209), the process skips step S210 and transfers control to the clone virtual computer 250 (step S211).

The process temporarily shifts to processing in the clone virtual computer 250 (step S212). When the processing in the clone virtual computer 250 stops, the process returns to processing in the clone hypervisor 200.

When the process returns to processing in the clone hypervisor 200, the hypervisor stops the counter (step S231). The suspended state comparison unit 207 then compares the suspended state of the clone virtual computer 250 with the suspended state information at the head of the synchronization information buffer (step S214).

If the comparison result indicates that the stop position is not the desired stop position (step S215), the hypervisor restarts the counter (step S216), and the process returns to processing in step S250 (step S217).

If the comparison result indicates that the stop position is the desired stop position (step S215), the process shifts to processing in the clone hypervisor 200 (step S217). The hypervisor service execution unit 208 performs the processing in the clone hypervisor 200.

After step S217, the hypervisor service execution unit 208 determines a virtual computer to which control is to be transferred (step S218).

If the virtual computer to be activated is not the clone virtual computer 250 but is another virtual computer (step S219), the hypervisor performs processing in another virtual computer (step S220). Thereafter, the process returns to processing in the clone hypervisor 200 in step S217.

If the virtual computer to be activated is the clone virtual computer 250 (step S219), the process returns to step S203 to repeat the above processing.

A timing control method for matching the interrupt generation timing of the clone virtual computer 250 with the interrupt generation timing of the main virtual computer 150 will be described in detail below.

Some processor has a "function of stopping processing without any delay by generating an interrupt when a desired number of instructions are executed". A processor of this type can stop the execution of the clone virtual computer 250 at the same location where an interrupt has occurred in the main virtual computer 150, by using this function for the above timing control.

Some processor has a "function of stopping processing with a delay of a predetermined interrupt by generating an interrupt when a desired number of instructions are executed". For example, an Intel Pentium™ processor corresponds to such a processor. Assume that the above function is used for the above timing control. If an interrupt is generated when a desired number of instructions are executed, the position where the processing actually stops slightly shifts from the generation position of the interrupt due to the delay of the interrupt. Therefore, when a processor of this type simply uses the number of instructions executed, it is impossible to stop the clone virtual computer 250 at the same position as that where an interrupt has occurred in the main virtual computer 150. Therefore, performing the following processing can match the execution position of the main virtual computer 150 with that of the clone virtual computer 250.

An Intel Pentium™ processor has a register which measures the number of instructions executed (which will be referred to as a performance counter). When the number of instructions executed by the processor is counted by using this register, it is possible to make setting such that an interrupt (Performance Monitor Interrupt) is generated when a counter overflow occurs in the register (note that an interrupt cannot be generated depending on the model of the processor to be used).

Assume that when an interrupt is to be generated after the execution of 100 instructions to match the execution position of the main virtual computer 150 with that of the clone virtual computer 250, execution is started after the initial value of the counter is set to "−99". In this case, when 100 instructions are executed, the value of the counter changes from "−1" to "0". This causes an overflow and an interrupt. However, the actual occurrence of an interrupt is slightly delayed. In practice, therefore, an interrupt is generated after the execution of "100 instructions+several instructions" instead of "100 instructions". Since this delay amount is inconstant, the initial value of the counter is set in consideration of a delay to decrease the number of instructions executed until the generation of an interrupt. If, for example, an interrupt is to be generated in the main virtual computer 150 after the execution of 100 instructions, a value that reliably causes an interrupt before the execution of a predetermined number of instructions, e.g., "−90", instead of "−99", in the performance counter of the clone computer. Based on the specifications of the processor, the empirical rule based on actual measurements, and the like, this subtraction amount ("10 instructions" in this case) is set to a value that can reliably stop the processing before the execution of a predetermined number of instructions. An arbitrary method of determining this value can be used.

The following is a description of methods of advancing the stop position of the clone virtual computer 250, which has stopped several instructions, as a margin, before a predetermined number of instructions, to the position where an interrupt has occurred in the main virtual computer 150 in order to prevent the stop position from passing a desired location.

There are several such methods. For example, there is available a method of advancing processing in the clone virtual computer 250 instruction by instruction in a trace execution state, and executing steps until the stop position of the clone virtual computer 250 coincides with the stop position of the main virtual computer 150. According to another method, the execution of the clone virtual computer 250 is resumed after a breakpoint is set at the address of the position of the occurrence of an interrupt in the main virtual computer 150 by using the method of setting a breakpoint at an execution address used for general debugging operation.

Generating an interrupt using a breakpoint can reliably stop the execution of the clone virtual computer 250 at the same address. If a loop is being executed, the number of instructions executed may not have reached the number of instructions set in the main virtual computer 150 even though the interrupt address is the same. For this reason, when the virtual computer stops at a breakpoint, it is necessary to refer to the value of the performance counter to determine whether the virtual computer has stopped at the desired position.

Figure 8:
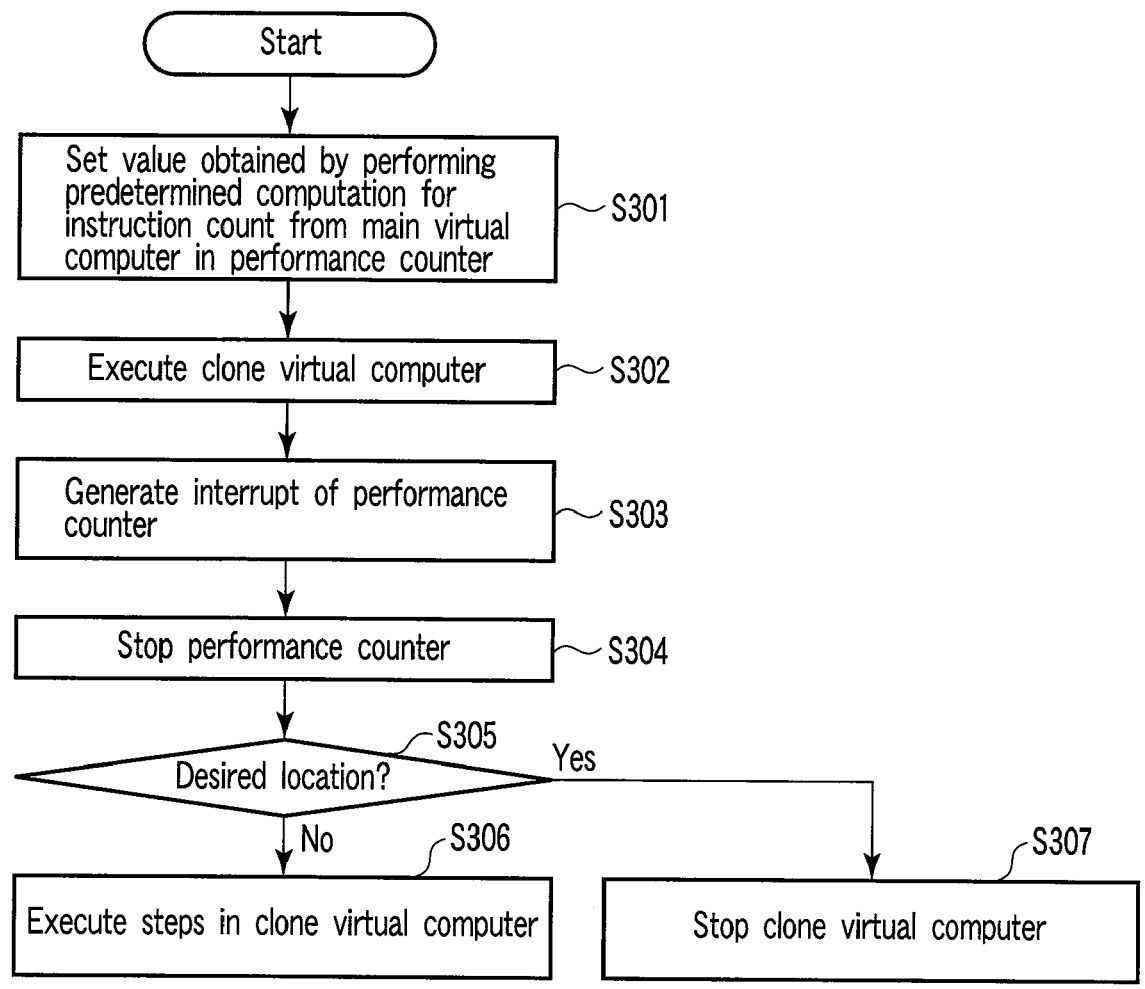
FIG. 8 is a flowchart showing an example of the processing procedure for causing a clone virtual computer to match the interrupt timing.

FIG. 8 shows an example of a processing procedure when the processing is to be advanced to a desired location by executing steps.

First of all, an initial value is set in the counter such that an overflow occurs when instructions are executed by the number of instructions obtained by subtracting "a predetermined value (the number of instructions)" from "the number of instructions executed by the main virtual computer 150 which is contained in synchronization information" (step S301). Letting Nm be the number of instructions executed by the main virtual computer 150 and Na be a predetermined number of instructions to be subtracted, a value C of the counter can be set by $C=(Nm-Na)*(-1)$.

After the above value is set in the performance counter, control is transferred to the clone virtual computer 250 (step S302).

Before the performance counter overflows, the processing in the clone virtual computer 250 may be suspended upon generation of an interrupt in the clone virtual computer 250, and the clone hypervisor 200 may perform corresponding processing. In this case, it suffices to suspend counting by the performance counter and resume the counter when the interrupt processing ends and control is transferred to the clone virtual computer 250 again (interrupts due to other factors are nondeterministic, and hence are not shown in FIG. 8).

When the performance counter overflows and an interrupt is generated during execution of processing by the clone virtual computer 250 (step S303), the hypervisor stops the performance counter (step S304). The hypervisor then acquires program counter information and performance counter information associated with the interrupt location and determines by comparison whether the interrupt location is the same as that in the main virtual computer 150 (step S305).

If they differ from each other, the hypervisor repeatedly executes steps to reach the desired location (steps S305 and S306).

If the desired location is reached in step S305, the hypervisor stops the processing in the clone virtual computer 250 (step S307), and transfers an event to the clone virtual computer 250 in accordance with the next synchronization information.

FIG. 9 shows another example of a processing procedure when the process is advanced to a desired location by executing steps.

First of all, an initial value is set in the counter such that an overflow occurs when instructions are executed by the number of instructions obtained by subtracting "a predetermined value (the number of instructions)" from "the number of instructions executed by the main virtual computer 150 which is contained in synchronization information" (step S401).

Upon setting the above value in the performance counter, the hypervisor transfers control to the clone virtual computer 250 (step S402).

If the performance counter overflows and an interrupt is generated during execution of processing in the clone virtual computer 250 (step S403), the hypervisor stops the performance counter (step S404), acquires program counter information and performance counter information which are associated with the interrupt location, and determines by comparison whether the interrupt location is the same as that in the main virtual computer 150 (step S405).

If the locations differ from each other, the hypervisor repeats the loop processing of steps S405, S406, S407, S408, and S404 until the desired location is reached.

That is, if it is determined in step S405 that the locations differ from each other, since the desired location has not been reached, the hypervisor sets a breakpoint at an address in the clone virtual computer 250 on the basis of the information of the program counter associated with the interrupt location in the main virtual computer 150 which is contained in the synchronization information (steps S405 and S406). Methods of setting such a breakpoint include a method of designating a stop position by using register for debugging operation for the CPU and a method of inserting an instruction for a breakpoint into the memory. An arbitrary method can be used.

Upon setting a breakpoint, the hypervisor causes the performance counter to restart counting, and transfer control to the clone virtual computer 250 (step S407). The hypervisor then waits until the breakpoint is reached. When the breakpoint is reached (step S408), the hypervisor stops the performance counter (step S404), and determines whether the stop location is reached (step S405).

If the desired location is reached in step S405, the hypervisor stops the processing in the clone virtual computer 250 (step S409), and transfers an event to the clone virtual computer 250 in accordance with next synchronization information.

In some case, an interrupt is generated due to a factor other than a breakpoint after a breakpoint is set and control is transferred to the clone virtual computer 250. In this case as well, it suffices to suspend counting of the performance counter until restoration from interrupt processing.

The above method can stop processing in the clone virtual computer 250 at the same location where processing is suspended by a nondeterministic interrupt in the main virtual computer 150. If the same interrupt vector as that on the main side is called in the clone virtual computer 250, interrupt processing is activated at the same location in the clone virtual computer 250.

As described above, according to this embodiment, the execution states of the virtual computer operating on two independent computers are uniformed, thereby implementing duplexing. Even if, therefore, the computer on which the main virtual computer operates stops due to a fault, the clone virtual computer can continue the same processing. This can conceal the fault. As described above, this embodiment can achieve high availability of the virtual computers.

Note that each function described above can be implemented by causing a computer described as software and having proper mechanisms to perform processing.

In addition, the embodiment can be implemented as programs for causing a computer to execute predetermined procedures, or causing the computer to function as predetermined means, or causing the computer to implement predetermined functions. In addition, the embodiment can be implemented as a computer-readable recording medium on which the programs are recorded.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A high availability system comprising a first server computer on which a first virtual computer and a first hypervisor for managing the first virtual computer operate, and a second server computer on which a second virtual computer and a second hypervisor for managing the second virtual computer operate, the first hypervisor comprising:

an acquisition unit configured to acquire synchronization information associated with an event, wherein the event has occurred in the first virtual computer and the event accompanies an input to the first virtual computer; and a transmission unit configured to transmit the acquired synchronization information to the second hypervisor, and the second hypervisor comprising:

a reception unit configured to receive the synchronization information from the first hypervisor; and a control unit configured to perform control to match an input to the second virtual computer with an input to the first virtual computer in accordance with the received synchronization information;

wherein the transmission unit transmits a plurality of pieces of synchronization information in an order in which events associated with the pieces of synchronization information have occurred; and wherein the control unit performs control to cause a plurality of events identical to a plurality of events which have occurred in the first virtual computer to occur in the second virtual computer in the same order as that in the first virtual computer by sequentially referring to the plurality of synchronization information in an order in which the pieces of synchronization information have been received.

2. A high availability system comprising a first server computer on which a first virtual computer and a first hypervisor for managing the first virtual computer operate, and a second server computer on which a second virtual computer and a second hypervisor for managing the second virtual computer operate, the first hypervisor comprising:

an acquisition unit configured to acquire synchronization information associated with an event, wherein the event has occurred in the first virtual computer and the event accompanies an input to the first virtual computer; and a transmission unit configured to transmit the acquired synchronization information to the second hypervisor, and the second hypervisor comprising:

a reception unit configured to receive the synchronization information from the first hypervisor; and a control unit configured to perform control to match an input to the second virtual computer with an input to the first virtual computer in accordance with the received synchronization information; and wherein the acquisition unit determines whether a timing at which the event occurs is nondeterministic or deterministic, and inserts, into the synchronization information, timing information for specifying a timing at which the event has occurred, when determining that the timing is nondeterministic;

which further comprises a counter control unit configured to clear a counter which holds an executed instruction count indicating the number of instructions executed when control is transferred from the first hypervisor to the first virtual computer, count the number of instructions executed afterward, and stop counting the executed instruction count when control is transferred from the first virtual computer to the first hypervisor, and in which the acquisition unit sets, as the timing information, an executed instruction count indicated by the counter when counting stops upon determining that a timing at which an event which has occurred when control is transferred from the first virtual computer to the first hypervisor is nondeterministic if the event is an interrupt associated with the first virtual computer.

3. The system according to claim 2, wherein when control is transferred from the first hypervisor to the first virtual computer, the counter control unit restarts the counter instead of clearing the counter if an event which has occurred when control is transferred from the first virtual computer to the first hypervisor is an interrupt which is not associated with the first virtual computer.

4. The system according to claim 2, wherein the control unit sets a breakpoint for causing an event identical to that associated with the synchronization information to occur in an instruction sequence executed by the second virtual computer in accordance with the executed instruction count included in the synchronization information.

5. The system according to claim 4, wherein the interrupt event indicated by the synchronization information is notified when control is transferred from the second hypervisor to the second virtual computer.

6. The system according to claim 2, wherein the second server computer is operable to generate an interrupt in the second virtual computer without any delay, when an event to generate the interrupt occurs, and the control unit generates an interrupt in the second virtual computer at the same timing as that at which an interrupt has occurred in the first virtual computer in accordance with the executed instruction count included in the synchronization information.

7. The system according to claim 2, wherein the control unit repeatedly executes one instruction or a plurality of instructions at a time for the second virtual computer until determining that the same timing as that of occurrence of an interrupt in the first virtual computer is reached, upon performing control to reliably stop execution of an instruction by the second virtual computer at a timing before a timing of occurrence of an interrupt in the first virtual computer, in accordance with the executed instruction count included in the synchronization information regardless of occurrence of the interrupt delay.

8. A high availability system comprising a first server computer on which a first virtual computer and a first hypervisor for managing the first virtual computer operate, and a second server computer on which a second virtual computer and a second hypervisor for managing the second virtual computer operate, the first hypervisor comprising:

an acquisition unit configured to acquire synchronization information associated with an event, wherein the event has occurred in the first virtual computer and the event accompanies an input to the first virtual computer; and a transmission unit configured to transmit the acquired synchronization information to the second hypervisor, and the second hypervisor comprising:

a reception unit configured to receive the synchronization information from the first hypervisor; and a control unit configured to perform control to match an input to the second virtual computer with an input to the first virtual computer in accordance with the received synchronization information, wherein the acquisition unit inserts a type of hypervisor call and argument information into the synchronization information associated with a time of suspension of processing in the first virtual computer when the event is hypervisor call.

9. The system according to claim 8, wherein the acquisition unit inserts response information of hypervisor call and information of a response route into the synchronization information associated with a time of restoration to processing in the first virtual computer when the event is hypervisor call.

10. A high availability system comprising a first server computer on which a first virtual computer and a first hypervisor for managing the first virtual computer operate, and a second server computer on which a second virtual computer and a second hypervisor for managing the second virtual computer operate, the first hypervisor comprising:

an acquisition unit configured to acquire synchronization information associated with an event, wherein the event has occurred in the first virtual computer and the event accompanies an input to the first virtual computer; and a transmission unit configured to transmit the acquired synchronization information to the second hypervisor, and the second hypervisor comprising:

a reception unit configured to receive the synchronization information from the first hypervisor; and a control unit configured to perform control to match an input to the second virtual computer with an input to the first virtual computer in accordance with the received synchronization information, wherein the acquisition unit inserts identification information of a virtual computer in which an interrupt handler is activated, interrupt information, and interrupt position information into the synchronization information associated with a time of suspension of processing in the first virtual computer when the event is an interrupt; and wherein the acquisition unit inserts information associated with interrupt handler call into the synchronization information associated with a time of restoration to processing in the first virtual computer when the event is an interrupt.

11. A non-transitory computer-readable medium storing instructions that, when executed by a computer, cause the computer to perform an execution state control method comprising:

acquiring, by a first hypervisor operating on a first server computer, synchronization information associated with an event, wherein the event has occurred in a first virtual computer operating on the first server computer and the event accompanies an input to the first virtual computer;

transmitting, by the first hypervisor, the acquired synchronization information to a second hypervisor operating on a second server computer;

receiving, by the second hypervisor, the synchronization information from the first hypervisor; and performing, by the second hypervisor, control to match an input to a second virtual computer operating on the second server computer with an input to the first virtual computer in accordance with the received synchronization information;

transmitting a plurality of pieces of synchronization information in an order in which events associated with the pieces of synchronization information have occurred; and causing a plurality of events identical to a plurality of events which have occurred in the first virtual computer to occur in the second virtual computer in the same order as that in the first virtual computer by sequentially referring to the plurality of synchronization information in an order in which the pieces of synchronization information have been received.

12. A non-transitory computer-readable medium storing instructions that, when executed by a computer, cause the computer to perform a method comprising:

acquiring synchronization information associated with an event, wherein the event has occurred in a first virtual computer associated with a first hypervisor operating on a first server computer and the event accompanies an input to the first virtual computer;

transmitting acquired synchronization information to a second hypervisor associated with a second virtual computer, receiving the synchronization information from the first hypervisor;

controlling to match an input to the second virtual computer with an input to the first virtual computer in accordance with the received synchronization information;

determining whether a timing at which the event occurs is nondeterministic or deterministic, and inserting, into the synchronization information, timing information for specifying a timing at which the event has occurred, when determining that the timing is nondeterministic;

clearing a counter which holds an executed instruction count indicating the number of instructions executed when control is transferred from the first hypervisor to the first virtual computer;

counting the number of instructions executed afterward, stopping counting of the executed instruction count when control is transferred from the first virtual computer to the first hypervisor, and setting, as the timing information, an executed instruction count indicated by the counter when counting stops upon determining that a timing at which an event which has occurred when control is transferred from the first virtual computer to the first hypervisor is nondeterministic if the event is an interrupt associated with the first virtual computer.

13. The non-transitory computer-readable medium according to claim 12, further comprising instructions that cause the counter to restart, instead of clearing the counter, if an event which has occurred when control is transferred from the first virtual computer to the first hypervisor is an interrupt that is not associated with the first virtual computer.

14. The non-transitory computer-readable medium of claim 12, further comprising instructions for setting a breakpoint for causing an event identical to that associated with the synchronization information to occur in an instruction sequence executed by the second virtual computer in accordance with the executed instruction count included in the synchronization information.

15. The non-transitory computer-readable medium of claim 14, further comprising instructions for causing the interrupt event indicated by the synchronization information to be notified when control is transferred from the second hypervisor to the second virtual computer.

16. The non-transitory computer-readable medium of claim 12, further comprising instructions for causing:

the second server computer to generate an interrupt in the second virtual computer without any delay, when an event to generate the interrupt occurs, and generating an interrupt in the second virtual computer at the same timing as that at which an interrupt has occurred in the first virtual computer in accordance with the executed instruction count included in the synchronization information.

17. The non-transitory computer-readable medium of claim 12, further comprising instructions for:

repeatedly executing one instruction or a plurality of instructions at a time for the second virtual computer until determining that the same timing as that of occurrence of an interrupt in the first virtual computer is reached, upon performing control to reliably stop execution of an instruction by the second virtual computer at a timing before a timing of occurrence of an interrupt in the first virtual computer, in accordance with the executed instruction count included in the synchronization information, regardless of occurrence of the interrupt delay.

18. A non-transitory computer-readable medium storing instructions that, when executed by a computer, cause the computer to perform:

acquiring synchronization information associated with an event, wherein the event has occurred in a first virtual computer associated with a first hypervisor operating on a first server computer and the event accompanies an input to the first virtual computer;

transmitting the acquired synchronization information to a second hypervisor, and receiving the synchronization information from the first hypervisor; and performing control to match an input to a second virtual computer with an input to the first virtual computer in accordance with the received synchronization information, wherein the acquisition unit inserts a type of hypervisor call and argument information into the synchronization information associated with a time of suspension of processing in the first virtual computer when the event is a hypervisor call.

19. The non-transitory computer-readable medium of claim 18, further comprising instructions for causing the acquisition unit to insert response information of the hypervisor call and information of a response route into the synchronization information associated with a time of restoration to processing in the first virtual computer, when the event is a hypervisor called.

20. A non-transitory computer-readable medium storing instructions that, when executed by a computer, cause the computer to perform the method of:

acquiring synchronization information associated with an event, wherein the event has occurred in a first virtual computer associated with a first hypervisor operating on a first server computer and the event accompanies an input to the first virtual computer;

transmitting acquired synchronization information to a second hypervisor associated with a second virtual computer, receiving the synchronization information from the first hypervisor;

controlling to match an input to a second virtual computer with an input to the first virtual computer in accordance with the received synchronization information, inserting identification information of a virtual computer in which an interrupt handler is activated, interrupt information, and interrupt position information into the synchronization information associated with a time of suspension of processing in the first virtual computer when the event is an interrupt; and inserting information associated with an interrupt handler call into the synchronization information associated with a time of restoration to processing in the first virtual computer when the event is an interrupt.

* * * * *